United States Patent [19]

Thor

[11] Patent Number: 4,591,857
[45] Date of Patent: May 27, 1986

[54] PROGRAMMABLE LFM SIGNAL PROCESSOR

[75] Inventor: Robert C. Thor, Liverpool, N.Y.

[73] Assignee: The United States of America as represented by the Secretary of the Air Force, Washington, D.C.

[21] Appl. No.: 512,848

[22] Filed: Jul. 11, 1983

[51] Int. Cl.⁴ .......................................... G01S 13/28
[52] U.S. Cl. ......................... 343/17.2 PC; 343/5 FT
[58] Field of Search ..................... 343/17.2 PC, 5 FT

[56] References Cited

U.S. PATENT DOCUMENTS

| 4,373,190 | 2/1983 | Lewis et al. | 343/17.2 PC X |
| 4,379,295 | 4/1983 | Lewis et al. | 343/17.2 PC |
| 4,509,051 | 4/1985 | Lewis | 343/5 FT X |
| 4,513,289 | 4/1985 | Kretschmer | 343/5 FT X |

*Primary Examiner*—T. H. Tubbesing
*Assistant Examiner*—Gilberto Barrón, Jr.
*Attorney, Agent, or Firm*—Donald J. Singer; Bernard E. Franz

[57] ABSTRACT

The linear frequency modulation (LFM) signal processor may be programmed to be a matched filter for any pulse compression (PC) ratio less than or equal to the square of the number of bandpass filters. The processor is implemented by using a fast Fourier transform (FFT) for the filter bank. The implementation shown assumes digital processing at baseband using in-phase and quadrature (I and Q) channels and an FFT for the filter bank. The I and Q channels are fed through a sidelobe filter, a short input tapped delay line, and a set of M complex multipliers to the FFT. The FFT outputs are connected to a long tapped delay line through a second set of complex multipliers whose outputs are summed in the long tapped delay line summer.

7 Claims, 5 Drawing Figures

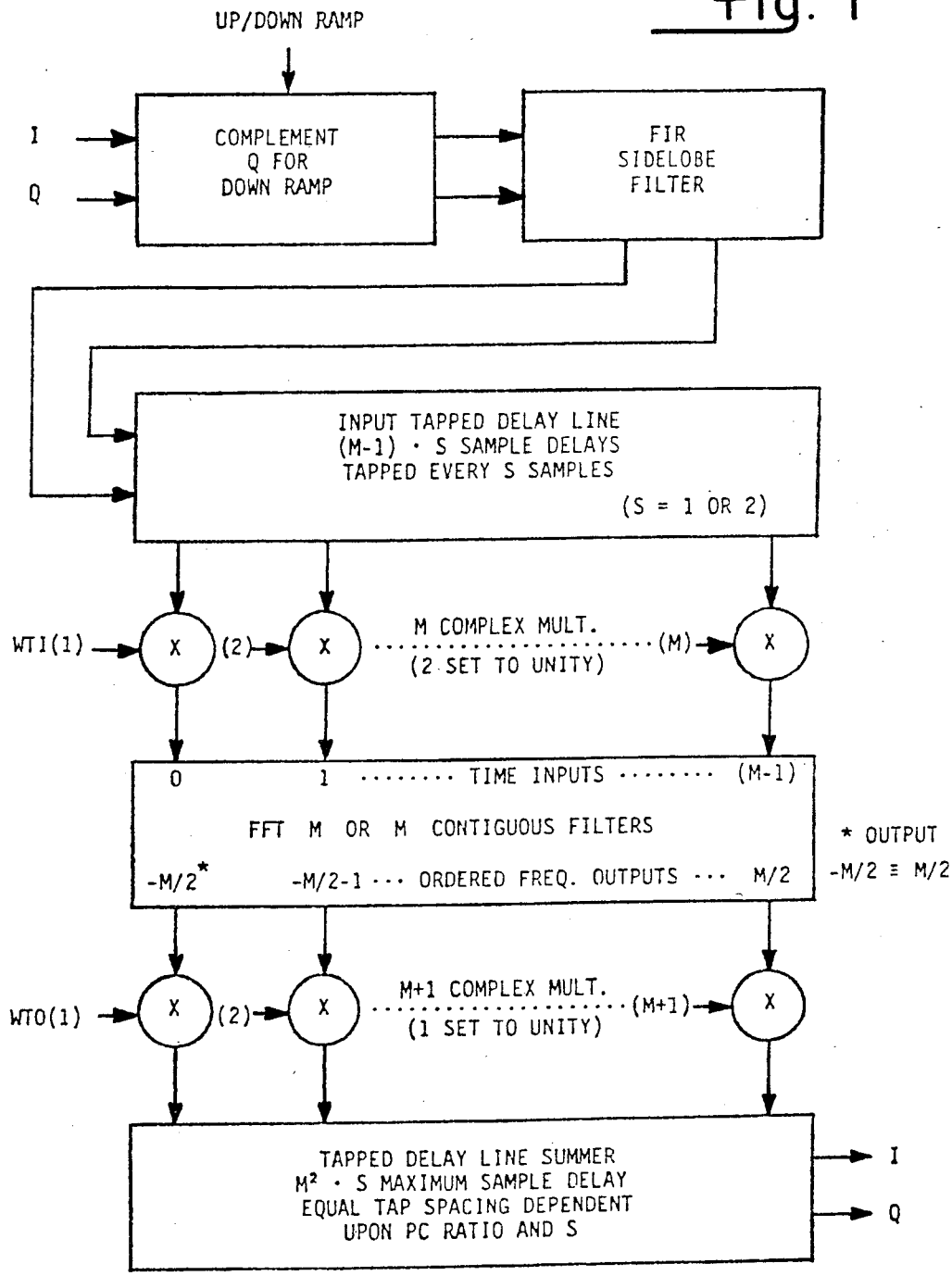

4,591,857

PROGRAMMABLE LFM SIGNAL PROCESSOR

RIGHTS OF THE GOVERNMENT

The invention described herein may be manufactured and used by or for the Government of the United States for all governmental purposes without the payment of any royalty.

BACKGROUND OF THE INVENTION

This invention relates to a programmable linear frequency modulation (LFM) signal processor, such as used in pulse compression radar systems.

PREVIOUS ART

One method for processing LFM signal waveforms that has been used for many years is the bandpass filter-tapped delay line technique. (see U.S. Pat. Nos. 3,165,741 to Thor, and 3,594,795 to Thor et al). In this technique when the product of the filter bandwidth and delay line increment equals unity, the pulse compression ratio is equal to the number of filters squared. This technique produces a "stair step" approximation to the LFM waveform which can be linearized if a parabolic phase compensation is included. A digital implementation of this type of system was made many years ago.

The book "Radar Handbook", M. I. Skolnik, Editor-In-Chief, McGraw-Hill Book Company, New York, N.Y. (1970) provides much background information on radar systems. Chapter 20 is on Pulse-Compression Radar", including linear frequency modulation. Chapter 35 is on "Digital Signal Processing", with the fast Fourier transform (FFT) described in Section 35.7.

Further background information may be found in the following U.S. Patents, which disclose various components and circuits which might be utilized for similar purposes in implementing the subject invention.

U.S. Pat. No. 3,950,750 to Churchill et al discloses a radar system in which signals separated in quadrature phase detector 26 into I and Q signals are passed through low pass filters $34_1$ and $34_2$ into compensator 38. In compensator 38 the I and Q signals are fed to a FFT.

U.S. Pat. No. 4,204,165 to Ready discloses in FIG. 14 a radar system in which the signal from bandpass filter 30 is introduced into a tapped delay line 131 and then through mixer 43 to multiplexed compression filter 45 (FIG. 7), which produces at its output a Fourier transform of the receiver input signal band. The output of 45 is fed to an I and Q sampler.

U.S. Pat. No. 4,225,864 to Lillington discloses in FIG. 2 the teaching of feeding I and Q signals through A/D converters to FFT Processors 18 and 19 which operate to provide a similar result to the filter banks 8 and 9 of FIG. 1.

U.S. Pat. No. 4,266,279 to Hines teaches a radar system in which I and Q signals are fed to a data sequencer 20, and a RAM circuit 21 to a FFT computer.

U.S. Pat. No. 4,333,080 to Collins et al discloses a signal processor in which, in pulse compression section 34, a down-chirp LFM pulse is produced. Section 40 separates the pulse into a pair of quadrature pulses. The output of section 40 is fed to weighting networks 54 and 56 (delays). The output of networks 54 and 56 is fed to a utilization device 80.

SUMMARY OF THE INVENTION

This invention relates to a programmable linear frequency modulation (LFM) signal processor which may be programmed to be a matched filter for any pulse compression (PC) ratio less than or equal to the square of the number of bandpass filters. The processor is implemented by using a fast Fourier transform (FFT) for the filter bank. The implementation shown assumes digital processing at baseband using in-phase and quadrature (I and Q) channels and an FFT for the filter bank. The I and Q channels are fed through a sidelobe filter, a short input tapped delay line, and a set of M complex multipliers to the FFT. The FFT outputs are connected to a long tapped delay line through a second set of complex multipliers whose outputs are summed in the long tapped delay line summer.

BRIEF DESCRIPTION OF THE DRAWING

FIG. 1 is an overall block diagram of a signal processor according to the invention.

DETAILED DESCRIPTION

Figure 3:
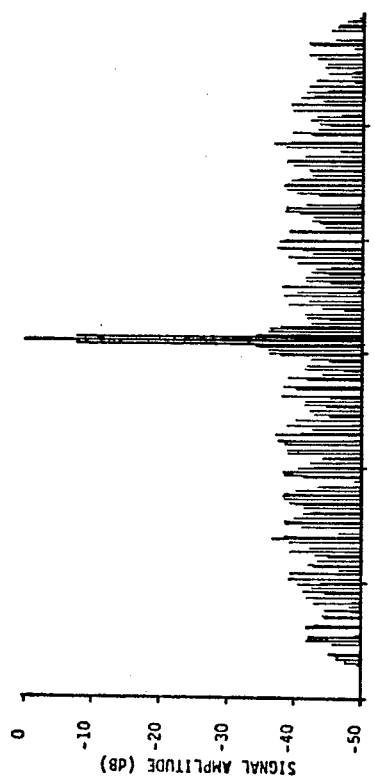
FIGS. 2-5 are graphs obtained from computer runs.

The following disclosure describes an extension of the delay line-bandpass filter pulse compression technique wherein a single LFM digital signal processor may be programmed to be a matched filter for any pulse compression ratio less than or equal to the square of the number of bandpass filters. Signal bandwidth is dependent upon the system clock rate of the equipment implementation.

One method for processing LFM signal waveforms that has been used for many years is the bandpass filter-tapped delay line technique. In this technique when the product of the filter bandwidth and the delay line increment equals unity, the pulse compression ratio is equal to the number of filters squared. This technique produces a "stair step" approximation the LFM waveform which can be linearized if a parabolic phase compensation is included. A digital implementation of this type of system was made many years ago.

GENERAL DESCRIPTION

The Programmable LFM Signal Processor is implemented by using an FFT for the filter bank. Complex weighting is applied to both the inputs of the filter bank to linearize the processor (parabolic phase compensation), and to the outputs of the filter bank to correct the signal phases when the pulse compression ratio is not the square of the FFT size. The tapped digital delay line has programmable tap spacing to allow changing the PC ratio. The signal processor is programmed to match the LFM slope of the desired signal. The configuration of the filter bank and the delay line tap spacing is adjusted to a PC ratio which is a larger (or equal) integer multiple of the FFT size. Amplitude weighting of the filter outputs is then used to shorten the effective pulse length to the desired PC ratio. A simple FIR filter in series with the input of the signal processor provides weighting for sidelobe suppression.

DESIGN CONSIDERATIONS

Several design considerations are necessary in determining the processor configuration in order to approximate radar requirements (pulse length, bandwidth, etc). Definite relationships exist between K (the PC ratio), T (the transmit pulse length), B (the signal bandwidth), F (the processor clock frequency), S (the oversampling desired, 1 or 2), and M (the FFT size).

Letting $K_o$=the next largest integer multiple of $M >= K$ and if the processor clock frequency and pulse length are given then:

$$\sqrt{K^*K_o} = T^*F/S$$

$$K_o = \text{Int}(0.99 + K/M)^*M$$

$$K = B^*T$$

$$B = (F/S^*\sqrt{K/K_o}.$$

With these relationships the signal bandwidth will be equal to or slightly less than the processor clock (or an integer submultiple). If a variable clock frequency is available, then the constraint on bandwidth or pulse length is removed.

PROCESSOR BLOCK DIAGRAM

The overall block diagram of the Programmable LFM Signal Processor is shown in FIG. 1. The implementation shown assumes digital processing at baseband using I and Q channels and an FFT for the filter bank. The slope of the LFM Processor (up or down ramp) is controlled by either complementing or not complementing the Q channel. The sidelobe filter may be of the simple finite impulse response (FIR) or a more complex type as desired for control of the sidelobes. The output of the sidelobe filter feeds the short input tapped delay line which stores the last $(M-1)^*S$ complex signal samples for use as inputs to the FFT. Between the short tapped delay line and the inputs of the filter bank is a set of M complex multipliers. The complex weights used remove the parabolic phase from the portion of the signal contained within the input tapped delay line. The complex weights used are a function of the value $K_o$ derived from the desired PC ratio K and form an even symmetrical function across the input taps. Two of the complex weights can be set to unity.

The outputs of the FFT are ordered in increasing frequency symmetric about the dc term. The highest frequency term (M/2) is used at both ends of the frequency range forming M+1 outputs. (The amplitude weights used on these two edge outputs is modified by one-half to compensate for its double use). The FFT outputs are connected to a long tapped delay line through a second set of complex multipliers. The phase shift corresponding to the output complex weights is a function of the value of $K_o$ and arises when $K_o < M^2$. The amplitude portion of the output complex weights is a function of the PC ratio K and the one-half factor used in the two-edge FFT outputs. The outputs of the complex multipliers are summed in the long tapped delay line summer. The delay line taps between summing are equal and determined by the value $K_o$ and the FFT size M.

The programming of the LFM Signal Processor can be accomplished by determining and storing the necessary coefficient weights in RAM, or if only a finite number of different waveforms are to be implemented, the weights can be predetermined and stored in a ROM. By this means, only ROM addressing and output delay line switching need be performed for each different signal waveform. Waveforms can then be easily changed on a pulse-to-pulse basis.

PROCESSOR DESIGN WEIGHTS

The input complex phase weights are determined as follows:

For $1 <= I <= M$ $$A(I) = I - 0.5^*(M-1)$$

$$WTIph(I) = [A(I)^2 - 0.25]^*\pi/K_o \text{ (radians)}.$$

The input complex amplitude weights are determined by:

$$L = \text{Int}[(M^2)/K_o]^*K_o/M$$

If:
$L < |A(I)|$ WTIamp(I)=0
$L = |A(I)|$ WTIamp(I)=0.5
$L > |A(I)|$ WTIamp(I)=1.0.

The output complex phase weights are determined as follows:

$$P = \pi^*K_o/(M^2)$$

$$P_m = \pi^*(M-1)/M$$

$$1 <= I <= M+1$$

$$C(I) = I - 1 - M/2$$

$$WTOph(I) = [P^*C(I) + P_m]^*C(I).$$

The output complex amplitude weights are determined by:

$$A_m = M^*\sqrt{(K/K_o)}$$

$$N = \text{Int}[(A_m - 1)/2]^* + 1$$

$$W = (A_m - N)/2$$

$$D_m = 1 + N/2$$

If:
$|C(I)| > D_m$ WTOamp(I)=0
$|C(I)| = D_m$ WTOamp(I)=W
$|C(I)| < D_m$ WTOamp(I)=1.

The long tapped delay line summer tap spacing is:

$$T_s = K_o^*S/M.$$

COMPUTER SIMULATION

A FORTRAN computer program was written which simulates the LFM Signal Processor on a PDP 11-40 computer. Single precision floating point arithmetic was used throughout the simulation and, therefore, more precision was achieved than will probably occur in an equipment implementation. The FIR sidelobe filter used is a three-pulse sum, configured as a $\cos^2$ on a pedestal frequency response.

Figure 2:
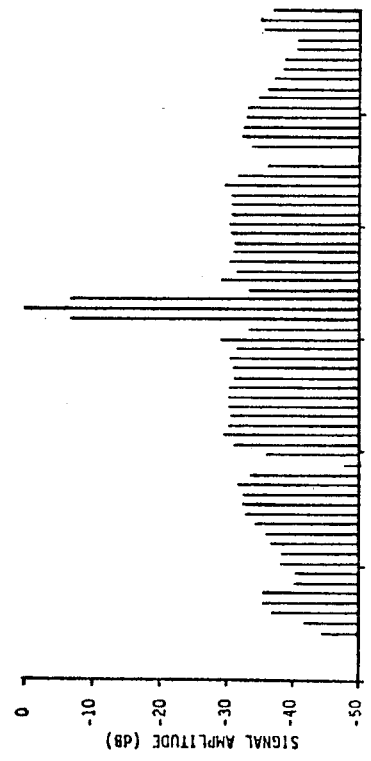
Figure 5:
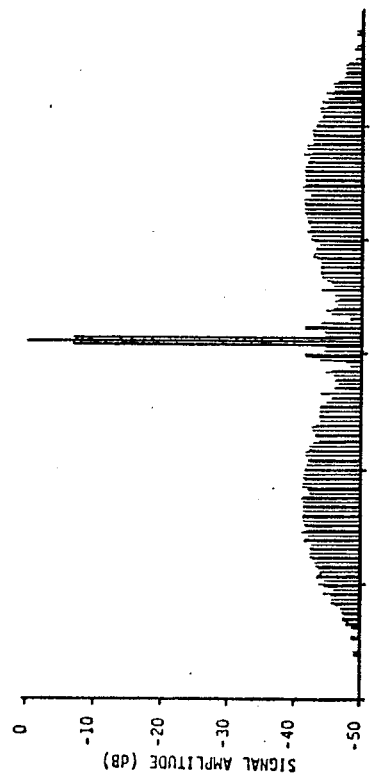
Figure 4:
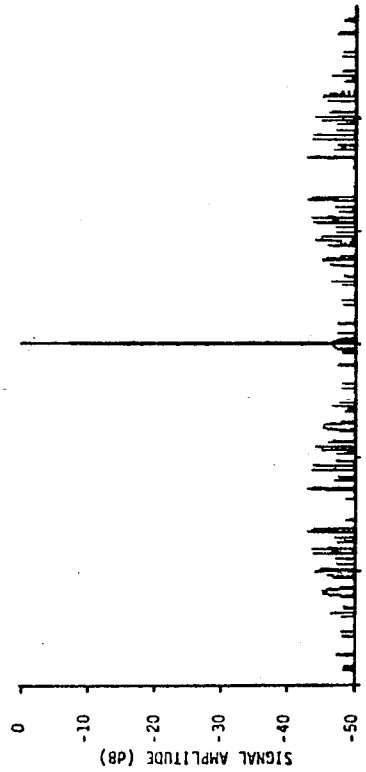

FIGS. 2 through 4 show typical computer runs for PC ratios of 24, 100, and 256. Lower sidelobe levels are achievable with the larger compression ratios. FIG. 5 shows the somewhat improved sidelobe level that can be obtained for PC ratios of less than $M^2/2$ by using amplitude weighting on both sets of complex multipliers (no FIR sidelobe filter is used in these cases).

DIGITAL IMPLEMENTATION OF LFM P.C. SYSTEM

FIG. 2

Parameters initially set:
(1) Pre filter cos**2 pedestal: 0.25000
(2) Oversampling rate (.LT. 1950/P.C.Ratio): 1.
(3) Ramp direction (1. up: 2. Down; 3. noise): 1.
(4) P.C. ratio (Max 512): 24.
(5) Pulse length: 100.00 microsec
(6) Input weighting: 0.
  0. uniform
  1. cosin
  2. hamming
  3. 30 db taylor
  4. 40 db taylor
(7) output weighting: 0.
(8) Doppler frequency: 0.0000 KHZ
(9) Linear (0.) or db (1.) Output: 1.
(10) One sigma noise AMP: 0.0000

Input Dispersive Phase Shifts (Radians)
5.497787, 4.123341, 2.945243, 1.963495, 1.178097, 0.589049, 0.196350, 0.000000, 0.000000, 0.196350, 0.589049, 1.178097, 1.963495, 2.945243, 4,123341, 5.497787.

Input Amplitude Weights
1.000000, 1.000000, 1.000000, 1.000000, 1.000000, 1.000000, 1.000000, 1.000000, 1.000000, 1.000000, 1.000000, 1.000000, 1.000000, 1.000000, 1.000000, 1.000000.

Output Phase Corrections (Radians)
1.570797, −1.374446, −3.534292, −4.908738, −5.497787, −5.301438, −4.319690, −2.552544, 0.000000, 3.337942, 7.461283, 12.370022, 18.064157, 24.543694, 31.808628, 39.858959, 48.694687.

OUTPUT Amplitude Weights
0.000000, 0.428283, 1.000000, 1.000000, 1.000000, 1.000000, 1.000000, 1.000000, 1.000000, 1.000000, 1.000000, 1.000000, 1.000000, 1.000000, 1.000000, 0.428203, 0.000000.

Number of Signal Samples: 28
Sample Interval: 3.6084 microsec
Pulse length and bandwidth increase factor: 1.154701
Maximum Signal: 138.111053

FIG. 3

Parameters initially set:
(1) Pre filter cos**2 pedestal: 0.12500
(2) Oversampling rate (.LT. 1950/P.C.Ratio): 1.
(3) Ramp direction (1. up; 2. down; 3. noise): 1.
(4) P.C. ratio (max 512): 100.
(5) Pulse length: 100.00 microsec
(6) Input weighting: 0.
  0. uniform
  1. cosin
  2. hamming
  3. 30 db taylor
  4. 40 db taylor
(7) output weighting: 0.
(8) dopper frequency: 0.0000 KHZ
(9) linear (0.) or db (1.) output: 1.
(18) one sigma noise amp: 0.0000

Input Dispersive phase shifts (radians)
1.570796, 1.178097, 0.841498, 0.560999, 0.336599, 0.168300, 0.056100, 0.000000, 0.000000, 0.056100, 0.168388, 0.336599, 0.560999, 0.841498, 1.178097, 1.570796.

Input Amplitude Weights
0.000000, 1.000000, 1.000000, 1.000000, 1.000000, 1.000000, 1.000000, 1.000000, 1.000000, 1.000000, 1.000000, 1.000000, 1.000000, 1.000000, 1.000000, 0.000000.

Output Phase Corrections (radians)
64.402657, 46.731194, 31.808628, 19.634956, 10.210177, 3.534292, −0.392699, −1.570796, 0.000000, 4.319690, 11.388274, 21.205751, 33.772121, 49.087387, 67.151543, 87.964600, 111.526543.

Output Amplitude weights
0.059289, 1.000000, 1.000000, 1.000000, 1.000000, 1.000000, 1.000000, 1.000000, 1.000000, 1.000000, 1.000000, 1.000000, 1.000000, 1.000000, 1.000000, 1.000000, 0.059389.

Number of signal samples: 106
Sample Interval: 0.9449 microsec
Pulse length and bandwidth increase factor: 1.058301
Maximum signal: 123.397095

FIG. 4

Parameters initially set:
(1) Pre filter cos**2 pedestal: 0.08000
(2) Oversampling rate (.LT. 1950/P.C.Ratio): 1.
(3) Ramp direction (1. up; 2. down; 3. noise): 1.
(4) P.C. ratio (max 513): 256.
(5) Pulse length: 100.00 microsec
(6) Input weighting: 0.
  0. uniform
  1. cosin
  2. hamming
  3. 30 db taylor
  4. 40 db taylor
(7) output weighting: 0.
(8) dopper frequency: 0.0000 KHZ
(9) linear (0.) or db (1.) output: 1.
(18) one sigma noise amp: 0.0000

Input Dispersion Phase Shifts (radians)
0.687223, 0.515418, 0.368155, 0.245437, 0.147262, 0.073631, 0.024544, 0.000000, 0.000000, 0.024544, 0.073631, 0.147262, 0.245437, 0.368155, 0.515418, 0.687223.

Input Amplitude Weights
1.000000, 1.000000, 1.000000, 1.000000, 1.000000, 1.000000, 1.000000, 1.000000, 1.000000, 1.000000, 1.000000, 1.000000, 1.000000, 1.000000, 1.000000, 1.000000.

Output Phase Corrections (radians)
177.500000, 133.321350, 95.425888, 63.813606, 38.484512, 19.438604, 6.675885, 0.196350, 0.000000, 6.086836, 18.456858, 37.110062, 62.046455, 93.266037, 130.768799, 174.554764, 224.623886.

Output Amplitude Weights
0.500000, 1.000000, 1.000000, 1.000000, 1.000000, 1.000000, 1.000000, 1.000000, 1.000000, 1.000000, 1.000000, 1.000000, 1.000000, 1.000000, 1.000000, 0.500000.

Number of signal samples: 256
Sample interval: 0.3906 microsec
Pulse length and bandwidth increase factor: 1.000000
Maximum signal: 137.576324

FIG. 5

Parameters initially set:
(1) Pre filter cos**2 pedestal: 1.00000
(2) Oversampling rate (.LT. 1950/P.C.Ratio): 1.
(3) Ramp direction (1. up; 2. down; 3. noise): 1

(4) P.C. ratio (max 512): 100.
(5) Pulse length: 100.00 microsec
(6) Input weighting: 4.
   0. uniform
   1. cosin
   2. hamming
   3. 30 db taylor
   4. 40 db taylor
(7) Output weighting: 2.
(8) Doppler Frequency: 0.0000 KHZ
(9) Linear (0.) or db (1.) output: 1.
(18) One sigma noise amp: 0.0000
Input Dispersive Phase shifts (radians)
   1.570796, 1.178097, 0.841498, 0.560999, 0.336599, 0.168300, 0.056100, 0.000000, 0.000000, 0.056100, 0.168300, 0.336599, 0.560999, 0.841498, 1.178097, 1.570796.
Input Amplitude Weights
   0.000000, 0.122625, 0.226114, 0.391285, 0.581181, 0.767439, 0.916809, 1.000000, 1.000000, 0.916809, 0.767439, 0.581181, 0.391285, 0.226115, 0.122625, 0.000000.
Output Phase Corrections (radians)
   64.402657, 46.731194, 31.808628, 19.634956, 10.210177, 3.534292, −0.392699, −1.570796, 0.000000, 4.319690, 11.388274, 21.205751, 33.772121, 49.087387, 67.151543, 87.964600, 111.526543.
Output Amplitude Weights
   (0.005199, 0.92370, 0.173254, 0.316575, 0.497933, 0.686453, 0.850040, 0.960843, 1.000000, 0.960843, 0.850040, 0.686453, 0.497933, 0.316575, 0.173254, 0.092370, 0.005199.)
Number of Signal Samples: 106
Sample Interval: 0.9449 microsec
Pulse Length and Bandwidth Increase Factor: 1.058301
Maximum Signal: 65.205513

Thus, while preferred constructional features of the invention are embodied in the structure illustrated herein, it is to be understood that changes and variations may be made by the skilled in the art without departing from the spirit and scope of my invention.

I claim:
1. A signal processor for a linear frequency modulation (LFM) pulse compression system with digital processing at baseband using in-phase (I) and quadrature (Q) channels, in which the slope of the LFM processor (up or down ramp) is selectively controlled by either complementing or not complementing the Q channel, the signal processor being programmed to match the LFM slope of a desired signal;
   a sidelobe filter with inputs from the I and Q channels;
   an input tapped delay line with inputs from the sidelobe filter, having (M−1) multiplied by S sample delays tapped every S samples, S being selected from the values 1 and 2, the input tapped delay line having programmable tap spacing to allow changing the pulse compression ratio;
   a filter bank of the fast Fourier transform (FFT) type, a first set of M complex multipliers coupled between said input tapped delay line and the filter bank, in which complex weights used remove the parabolic phase from the portion of the signal contained within the input tapped delay line, the complex weights being a function of an integer value $K_o$ derived from a desired pulse compression (PC) ratio K and forming an even symmetrical function across the input taps;
   the complex phase weights WTIph(I) for said first set of complex multipliers for values of I from 1 to M inclusive being

$WTIph(I) = [A(I)^2 - 0.25]\pi/K_o$ (radians)

where $A(I) = I - 0.5*(M-1)$,
   the complex amplitude weights WTIamp(I) for said first set of complex multipliers for values of I from 1 to M inclusive being determined as follows:

$L = \text{Int}[(M^2)/K_o]*K_o/M$ if $L < |A(I)|$ WTIamp(I) = 0
   if $L = |A(I)|$ WTIamp(I) = 0.5
   if $L > |A(I)|$ WTIamp(I) = 1.0
   wherein the filter bank includes means for ordering its outputs in increasing frequency about a D.C. term, with the highest frequency term (M/2) being used at both ends of the frequency range forming M+1 outputs, the amplitude weights used on these two edge outputs being modified by one-half to compensate for its double use;
   a long tapped delay line, a second set of complex multipliers coupled between the outputs of said filter bank and inputs of the long tapped delay line, the phase shift corresponding to the output complex weights being a function of the value $K_o$ arising when $K_o$ is less than the value M squared, the amplitude portion of the output complex weights being a function of the PC ratio K and the one-half factor used in the two-edge filter bank outputs, the outputs of the second set of complex multipliers being summed in the long tapped delay line summer, the delay line taps between summing being equal as determined by the values $K_o$ and the filter bank size M;
   the complex phase weights WTOph(I) for said second set of complex multipliers for values of I from 1 to M+1 inclusive being $WTOph(I) = [P*C(I) + P_m]*C(I)$ (radians)

where
   $P = \pi*K_o/(M^2)$
   $P_m = \pi(M-1)/M$
   $C(I) = I - 1 - M/2$,
   the complex amplitude weights WTOamp(I) for said second set of complex multipliers for values of I from 1 to M+1 inclusive being determined as follows:

$A_m = M*K/K_o)^{\frac{1}{2}}$ $N = \text{Int}[A_m - 1)/2]*2 + 1$ $W = (A_m - N)/2$ $D_m = 1 + N/2$ if $|C(I)| < D_m$ WTOamp(I) = 0
   if $|C(I)| = D_m$ WTOamp(I) = W
   if $|C(I)| > D_m$ WTOamp(I) = 1.0
   and wherein the long tapped delay line summer tap spacing $T_s$ is:

$T_s = K_o*S/M$.

2. A signal processor for a linear frequency modulation (LFM) pulse compression system with digital processing at baseband using in-phase (I) and quadrature (Q) channels, in which the slope of the LFM processor (up or down ramp) is selectively controlled by either complementing or not complementing the Q channel, the signal processor being programmed to match the LFM slope of a desired signal;

an input tapped delay line with inputs coupled from the I and Q channels, having (M−1) multiplied by S sample delays tapped every S samples, S being selected from the values 1 and 2, the input tapped delay line having programmable tap spacing to allow changing the pulse compression ratio;

a filter bank of the fast Fourier transform (FFT) type, a first set of M complex multipliers coupled between said input tapped delay line and the filter bank, in which complex weights used remove the parabolic phase from the portion of the signal contained within the input tapped delay line, the complex weights being a function of a value $K_o$ derived from a desired pulse compression (PC) ratio K and forming an even symmetrical function across the input taps, two of the complex weights being set to unity in the first set of complex multipliers;

wherein the filter bank includes means for ordering its outputs in increasing frequency about a D.C. term, with the highest frequency (M/2) being used at both ends of the frequency range forming M+1 outputs, the amplitude weights used on these two edge outputs being modified by one-half to compensate for its double use;

a long tapped delay line, a second set of complex multipliers coupled between the outputs of said filter bank and inputs of the long tapped delay line, the phase shift corresponding to the output complex weights being a function of the value $K_o$ arising when $K_o$ is less than the value M squared, the amplitude portion of the output complex weights being a function of the PC ration K and the one-half factor used in the two-edge filter bank outputs, the outputs of the second set of complex multipliers being summed in the long tapped delay line summer, the delay line taps between summing being equal as determined by the value $K_o$ and the filter bank size M; the signal processor includes a memory, programming being accomplished by determining and storing the necessary coefficient weights; and wherein amplitude weighting is included in both sets of complex multipliers, with the pulse compression ratio less than one-half of M squared ($M^2/2$);

the complex phase weights WTIph(I) for said first set of complex multipliers for values of I from 1 to M inclusive being $WTIph(I) = [A(I)^2 - 0.25]*\pi/K_o$ (radians)

where $A(I) = I - 0.5*(M-1)$, the compex amplitude weights WTIamp(I) for said first set of complex multipliers for values of I from 1 to M inclusive being determined as follows:

$L = \text{Int}[(M^2)/K_o]*K_o/M$

If $L < |A(I)|$ WTIamp(I) = 0
if $L = |A(I)|$ WTIamp(I) = 0.5
if $L > |A(I)|$ WTIamp(I) = 1.0 the complex phase weights WTOph(I) for said second set of complex multipliers for values of I from 1 to M+1 inclusive being $WTOph(I) = [P*C(I) + P_m]*C(I)$ (radians)

where
$P = \pi*K_o/(M^2)$
$P_m = \pi(M-1)/M$
$C(I) = I - 1 - M/2$, the complex amplitude weights WTOamp(I) for said second set of complex multipliers for values of I from 1 to M+1 inclusive being determined as follows:

$A_m = M*(K/K_o)^{\frac{1}{2}}$ $N = \text{Int}[A_m - 1)/2]*2 + 1$ $W = (A_m - N)/2$ $D_m = 1 + N/2$ if $|C(I)| < D_m$ WTOamp(I) = 0
if $|C(I)| = D_m$ WTOamp(I) = W
if $|C(I)| > D_m$ WTOamp(I) = 1.0 and wherein the long tapped delay line summer tap spacing $T_s$ is:

$T_s = K_o*S/M$.

3. A signal processor according to claim 1, wherein two of the complex weights are set to unity in the first set of complex multipliers.

4. A signal processor according to claim 3 in which the signal processor includes a memory, programming being accomplished by determining and storing the necessary coefficient weights.

5. A signal processor according to claim 4, in which the memory is a random access type.

6. A signal processor according to claim 4, in which the memory is a read-only type, to implement only a finite number of different waveforms, in which the weights are predetermined and stored in the memory, so that only memory addressing and output delay line switching need be performed for each different signal waveform, and waveforms can be easily changed on a pulse-to-pulse basis.

7. A signal processor according to claim 4, wherein said sidelobe filter is of the simple finite impulse response (FIR) type.

* * * * *

UNITED STATES PATENT AND TRADEMARK OFFICE
CERTIFICATE OF CORRECTION

PATENT NO. : 4,591,857

DATED : May 27, 1986

INVENTOR(S) : Robert C. Thor

It is certified that error appears in the above-identified patent and that said Letters Patent is hereby corrected as shown below:

At column 4, line 39, "*+1" should read ---*2+1---.

At column 8, line 7, (claim 1) "$\pi/K_o$" should read ---*$\pi/K_o$---.

Signed and Sealed this

Twenty-first Day of October, 1986

[SEAL]

*Attest:*

DONALD J. QUIGG

*Attesting Officer*     *Commissioner of Patents and Trademarks*